United States Patent
Chen et al.

(10) Patent No.: US 9,588,014 B2
(45) Date of Patent: Mar. 7, 2017

(54) ERROR MEASURING METHOD OF GEAR

(71) Applicant: NATIONAL CENTRAL UNIVERSITY, Jhongli, Taoyuan County (TW)

(72) Inventors: Yi-Cheng Chen, Jhongli (TW); Ming-Hung Chang, Jhongli (TW)

(73) Assignee: NATIONAL CENTRAL UNIVERSITY, Jhongli, Taoyuan County (TW)

( * ) Notice: Subject to any disclaimer, the term of this patent is extended or adjusted under 35 U.S.C. 154(b) by 447 days.

(21) Appl. No.: 14/167,221

(22) Filed: Jan. 29, 2014

(65) Prior Publication Data

US 2015/0066390 A1     Mar. 5, 2015

(30) Foreign Application Priority Data

Aug. 30, 2013   (TW) .............................. 102131227 A

(51) Int. Cl.
*G01B 5/28*     (2006.01)
*G01M 13/02*     (2006.01)

(52) U.S. Cl.
CPC ................................. *G01M 13/021* (2013.01)

(58) Field of Classification Search
CPC ............................. G01M 13/00; G01M 13/021
See application file for complete search history.

(56) References Cited

U.S. PATENT DOCUMENTS

| | | | | |
|---|---|---|---|---|
| 4,336,711 A | * | 6/1982 | Maehara | G01M 13/021 702/113 |
| 2003/0033094 A1 | * | 2/2003 | Huang | G06F 17/14 702/39 |
| 2012/0253694 A1 | * | 10/2012 | Young | G01H 1/00 702/34 |

(Continued)

OTHER PUBLICATIONS

Gang Cheng, Yu-long Cheng a, Li-hua Shen b, Jin-bo Qiu b, Shuai Zhang a, "Gear fault identification based on Hilbert-Huang transform and SOM neural network", Nov. 10, 2012, Measurement 46 (2013) 1137-1146.*

(Continued)

*Primary Examiner* — Matthew G Marini
(74) *Attorney, Agent, or Firm* — Bacon & Thomas, PLLC

(57) ABSTRACT

An error measuring method of gear includes: performing the single gear flank testing to the gear pair in order to produce a testing signal graph; the operation unit decomposing the testing signal graph by Empirical Mode Decomposition (EMD) to generate a plurality of intrinsic-mode-function graphs (IMFs), the intrinsic-mode-function graph (IMF) having a first function graph with a first range and a second function graph with a second range, the first range is greater than the second range; the operation unit selecting a plurality of third function graph from the intrinsic-mode-function graphs (IMFs), wherein the third range is greater than the second range but not greater than the first range; the operation unit combining the third function graphs to produce a graph of superposing function; the operation unit computing out a plurality of single pitch error, a plurality of adjacent pitch error and an accumulated pitch error.

4 Claims, 8 Drawing Sheets

(56) References Cited

U.S. PATENT DOCUMENTS

2013/0080378 A1* 3/2013 Huang ............... G06F 17/18
706/54

OTHER PUBLICATIONS

Yaguo Lei, Jing Lin a, Zhengjia He a, Ming J. Zuo b, "A review on empirical mode decomposition in fault diagnosis of rotating machinery", Oct. 18, 2012, Mechanical Systems and Signal Processing 35 (2013) 108-126.*

P J Sweeney, BE, PhD and R B Randall, "Gear transmission error measurement using phase demodulation", 1996, Journal of Mechanical Engineering Science vol. 210 p. 201-213.*

* cited by examiner

ERROR MEASURING METHOD OF GEAR

BACKGROUND OF THE INVENTION (1) Field of the Invention

The present invention relates to an error measuring method of gear, particularly for one can be used in association with a single gear flank tester.

(2) Description of the Prior Art

Currently, conventional gear measuring instrument popularly used in the industry is a kind of gear tester with a probing feeler of miniature ball in touching the flank of the gear tooth for determining the precision of the gear. However, such conventional gear measuring method can only be used for single gear with limitation for specific position on tooth profile, which is not suitable for determining related transmission error for a pair of mating gears (or called gear pair).

Therefore, for gears of high precision and low noise, a conventional single flank gear tester is often used to determining the precision and meshing condition of the gear pair. Normally, the conventional single flank gear tester mainly comprises a pair of mating and meshing gears (or called gear pair) containing an active gear (or called driving gear) and a passive gear (or called driven gear) with specific gear ratio and speed ratio thereof for effectively and smoothly transmitting torque and power of the active gear to the passive gear in accordance with the gear ratio and speed ratio thereof so that an expected output rotational speed and torque can be obtained functionally. However, in practically, certain intermittence may happen in the meshing action of the mating gear pair incurred by assembly error and process error. Usually, the intermittence is defined as transmission error of the gear pair. Additionally, with such conventional single flank gear tester, via analyses of profile error of each gear, accumulated pitch error of gears and adjacent pitch error of gears, the integrated transmission error of mating gear pair can be quickly determined so that it is suitably used for quality control (QC) in the industry.

For analysis the signals generated by the conventional single flank gear tester, the Fast Fourier Transform (FFT) is usually used with meshing frequency to divide the signals into high frequency and low frequency portions. Wherein, the high frequency portion, which mainly relates to tooth profile of the gear, is used to determine profile error of gear while the low frequency portion, which mainly relates to deflection of pitch circle in the gear, is used to determine accumulated pitch error of gears. Moreover, the relationship between the frequency and amplitude as well as the related features in the gear precision and transmission noise can be obtained by means of analysis in frequency spectrum for the signals.

The drawback for the Fast Fourier Transform (FFT) aforesaid is that it is difficult to define the meshing condition for the measured gear pair because certain phase shift or phase deviation is incurred by the filtering of wave frequency so that erroneous judgment on the gear precision is almost inevitable. Therefore, how to overcome the difficulty in definition of the meshing condition for the measured gear pair becomes a critical problem for this issue. Thus, the gear precision can be determined in better degree if the difficulty in definition of the meshing condition for the measured gear pair can be solved.

SUMMARY OF THE INVENTION

Accordingly, the primary object of the present invention is to provide an error measuring method of gear so that the single pitch error of gears, adjacent pitch error of gears and accumulated pitch error of gears can be defined more precisely.

For the purpose of achieving partial, overall or other objects, an exemplary preferred embodiment of the present invention provide an error measuring method of gear, which comprises following steps: a gear pair and a single gear flank testing device with an operation unit are provided so that the single gear flank testing device performs the single gear flank testing to the gear pair for obtaining a transmission error data, which is used to produce a testing signal graph; the operation unit decomposes the previous testing signal graph by means of Empirical Mode Decomposition (EMD) to generate a plurality of preliminary intrinsic-mode-function graphs (IMFs); wherein the first function graph has a first frequency value with first a numerical range such that the first frequency value thereof is most close to the meshing frequency of the gear pair 100 while the second function graph has a second frequency value with a second numerical range such that the second frequency value thereof is most close to the rotational frequency of the gear pair 100; moreover, the first numerical range is greater than the second numerical range; the operation unit selects a plurality of third function graph with a third frequency value and a third numerical range from the intrinsic-mode-function graphs (IMFs) such that the third numerical range is greater than the second numerical range but not greater than the first numerical range; the operation unit combines the third function graph to produce a graph of superposing function, which contains a plurality of wave crests; and by means of foregoing wave crests in the graph of superposing function produced by the third function graph, the profile error of gear produced by the first function graph and the deflection error of gear produced by the second function graph, the operation unit computes out a plurality of single pitch error of gears, a plurality of adjacent pitch error of gears and an accumulated pitch error of gears, which are respectively defined as below: the single pitch error of gears is defined as the difference of wave crest values for every pair of adjacent pitches, the adjacent pitch error of gears is defined as the difference of single pitch error of gears for every pair of adjacent pitches, and the accumulated pitch error of gears is defined as the combination of every single pitch error of gears for all pitches.

In an exemplary embodiment of the error measuring method of gear, the step for selecting at least one first intrinsic-mode-function graph (IMF) and another second intrinsic-mode-function graph (IMF) from previous intrinsic-mode-function graphs (IMFs) further includes following sub-step that said operation unit measures the amplitude of the first function graph to obtain a profile error of gear and measures the amplitude of the second function graph to obtain a deflection error of gear.

In an exemplary embodiment, the error measuring method of gear further includes following sub-step that by means of foregoing the profile error of gear, the deflection error of gear, the single pitch error of gears, the adjacent pitch error of gears and the accumulated pitch error of gears, the operation unit computes and defines out a gear precision of the gear pair.

In an exemplary embodiment of the error measuring method of gear, the step of that said operation unit decomposes the previous testing signal graph by means of Empirical Mode Decomposition (EMD) to generate a plurality of preliminary intrinsic-mode-function graphs (IMFs) further includes following sub-step that determine a conditional status whether there is any mode mixing case in the intrinsicmode-function graph (IMF); and the previous decision is made "Yes" that there is mode mixing case in the intrinsic-mode-function graph (IMF), then the operation unit further decomposes the previous testing signal graph by means of Ensemble Empirical Mode Decomposition (EEMD).

In an exemplary embodiment of the error measuring method of gear, the step that said operation unit measures the amplitude of the first function graph to obtain a profile error of gear is performed by the operation unit via average value for the upper envelope and lower envelope on the measured amplitude of the first function graph.

In an exemplary embodiment of the error measuring method of gear, the step that said operation unit measures the amplitude of the second function graph to obtain a deflection error of gear is performed by the operation unit via average value for the upper envelope and lower envelope on the measured amplitude of the second function graph.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
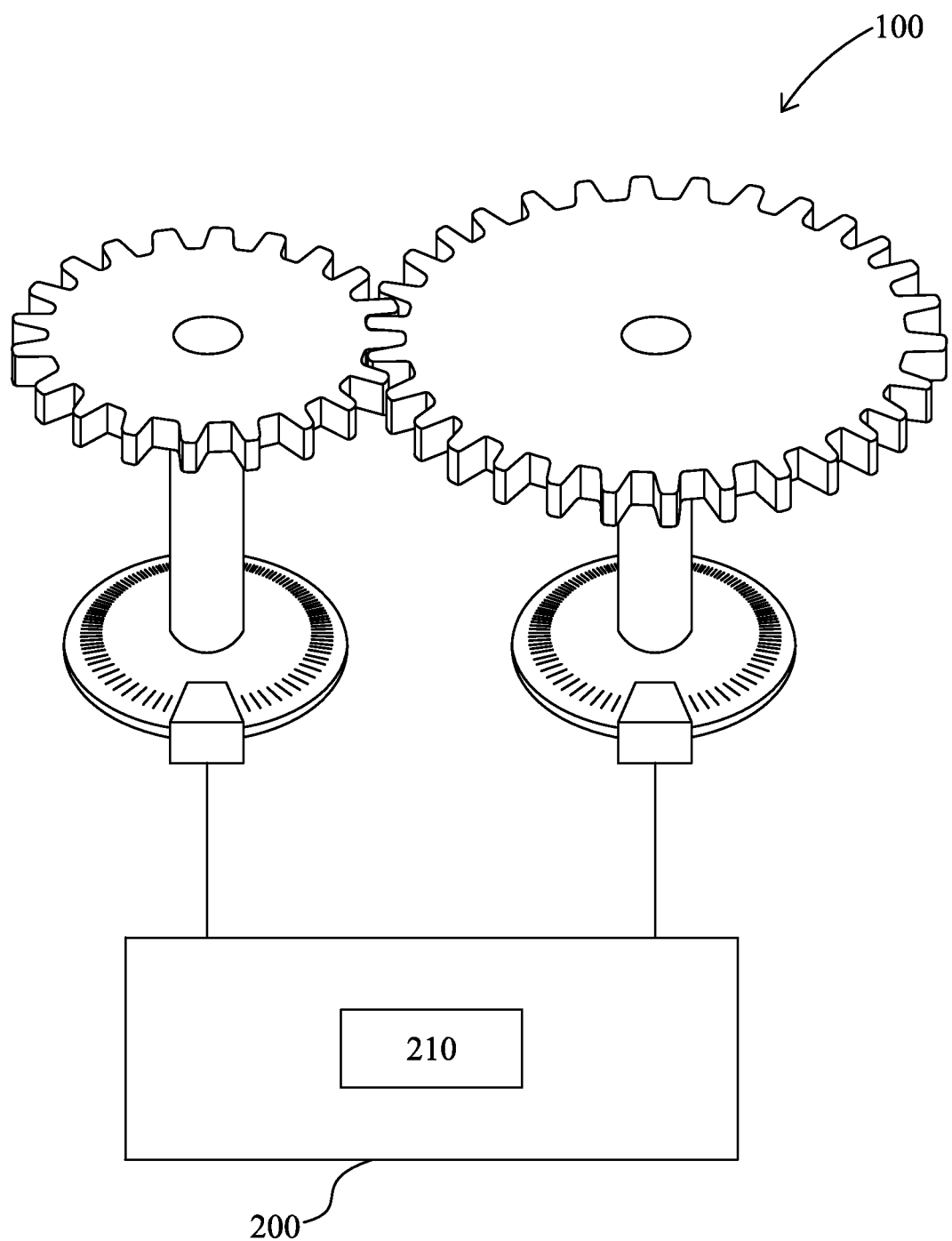
FIG. 1A is a schematic view for an exemplary preferred embodiment of the error measuring method of gear in the present invention.
Figure 1B:
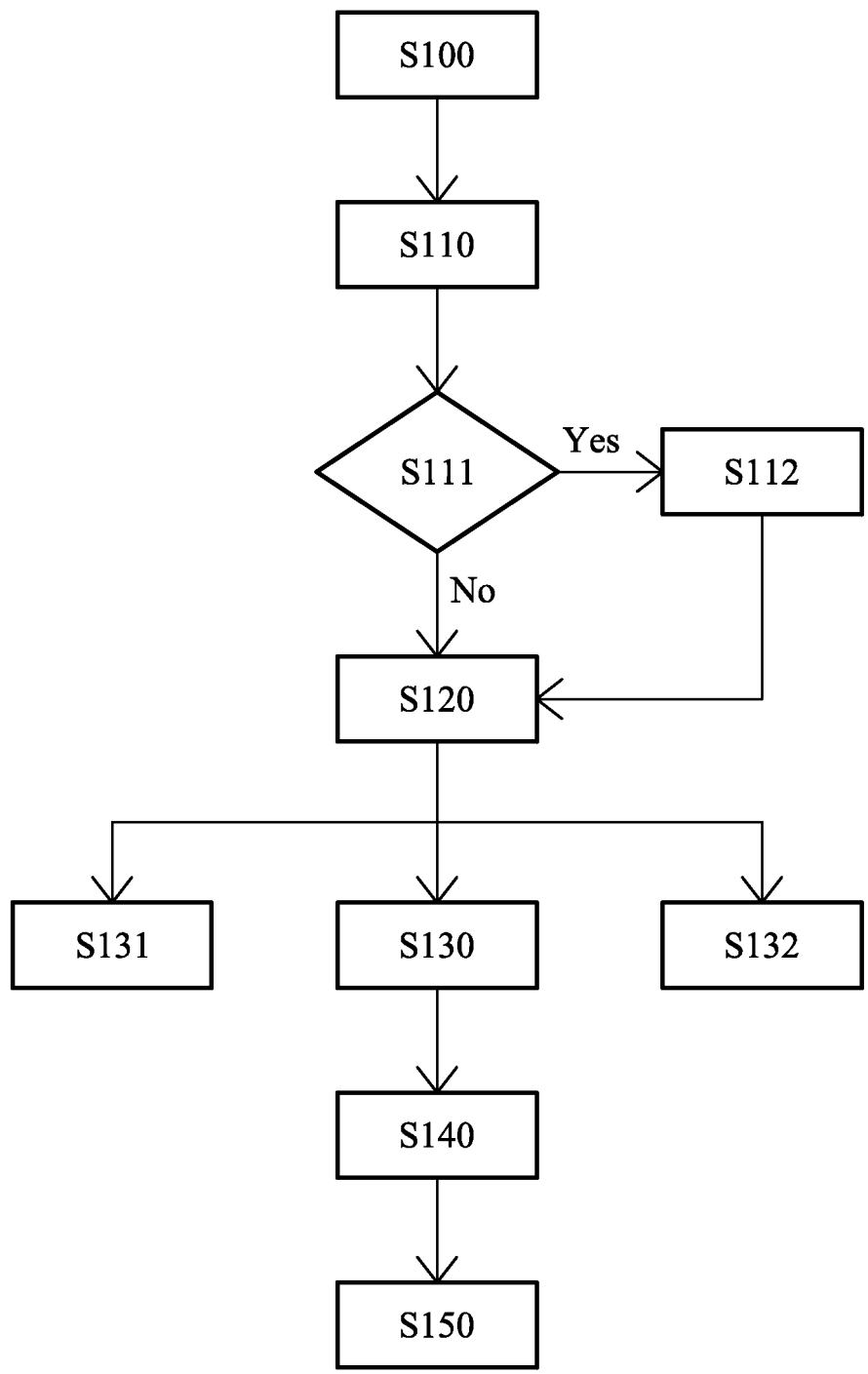
FIG. 1B is a diagrammatic flow chart showing all processing steps in an exemplary preferred embodiment of the error measuring method of gear in the present invention.

Please refer to FIGS. 1A and 1B. FIG. 1A is a schematic view for an exemplary preferred embodiment of the error measuring method of gear in the present invention while FIG. 1B is a diagrammatic flow chart showing all processing steps in an exemplary preferred embodiment of the error measuring method of gear in the present invention. All processing steps of the error measuring method of gear in the present invention are orderly described as below.

Figure 2:
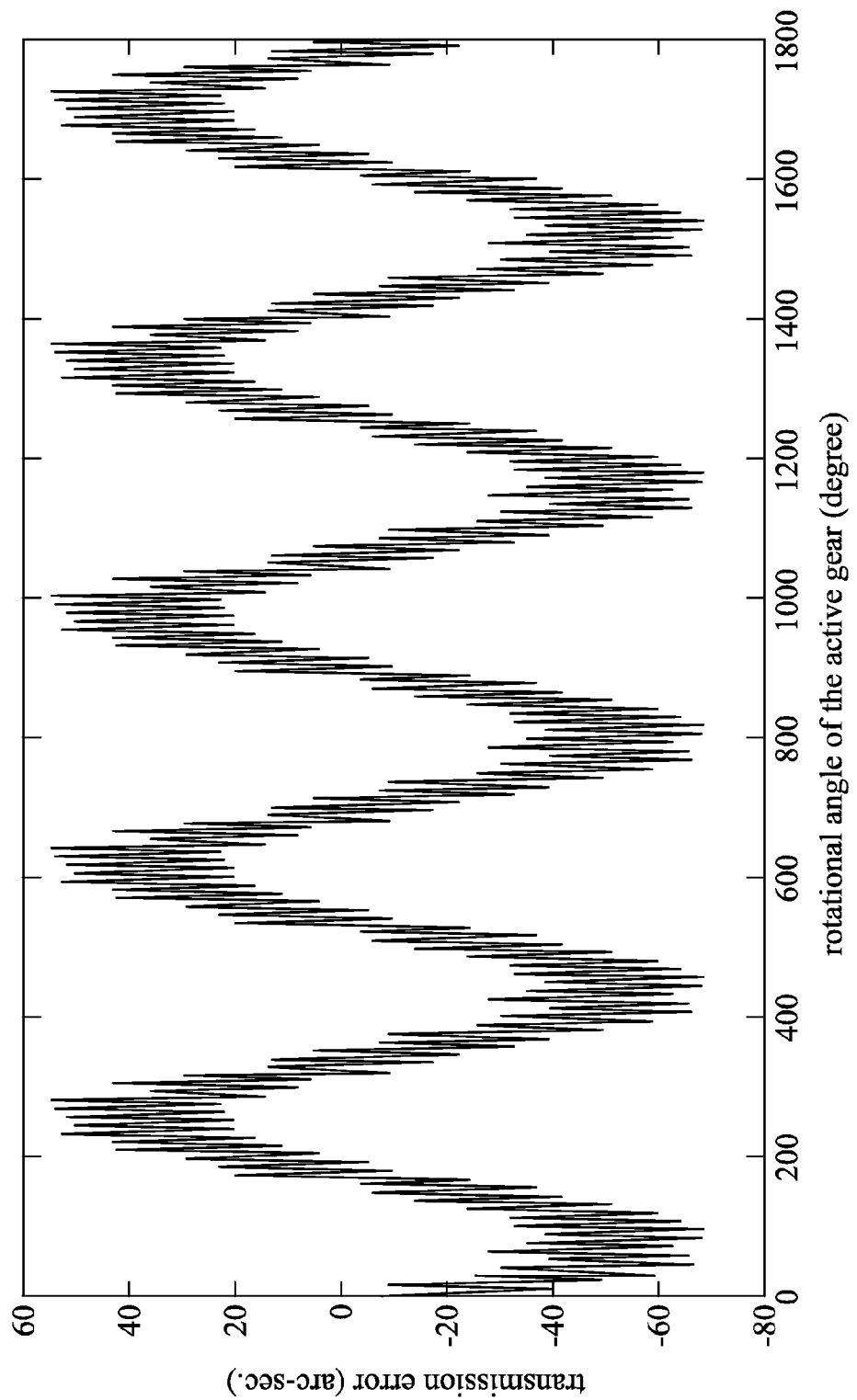
FIG. 2 is a graphic view showing a typical testing signal graph for an exemplary preferred embodiment of the error measuring method of gear in the present invention.

Step S100: a gear pair 100 and a single gear flank testing device 200 are provided such that the single gear flank testing device 200 includes an operation unit 210. The single gear flank testing device 200 will perform the single gear flank testing to the gear pair 100 for obtaining a transmission error data, which is used to produce a testing signal graph as shown in FIG. 2.

Figure 3A:
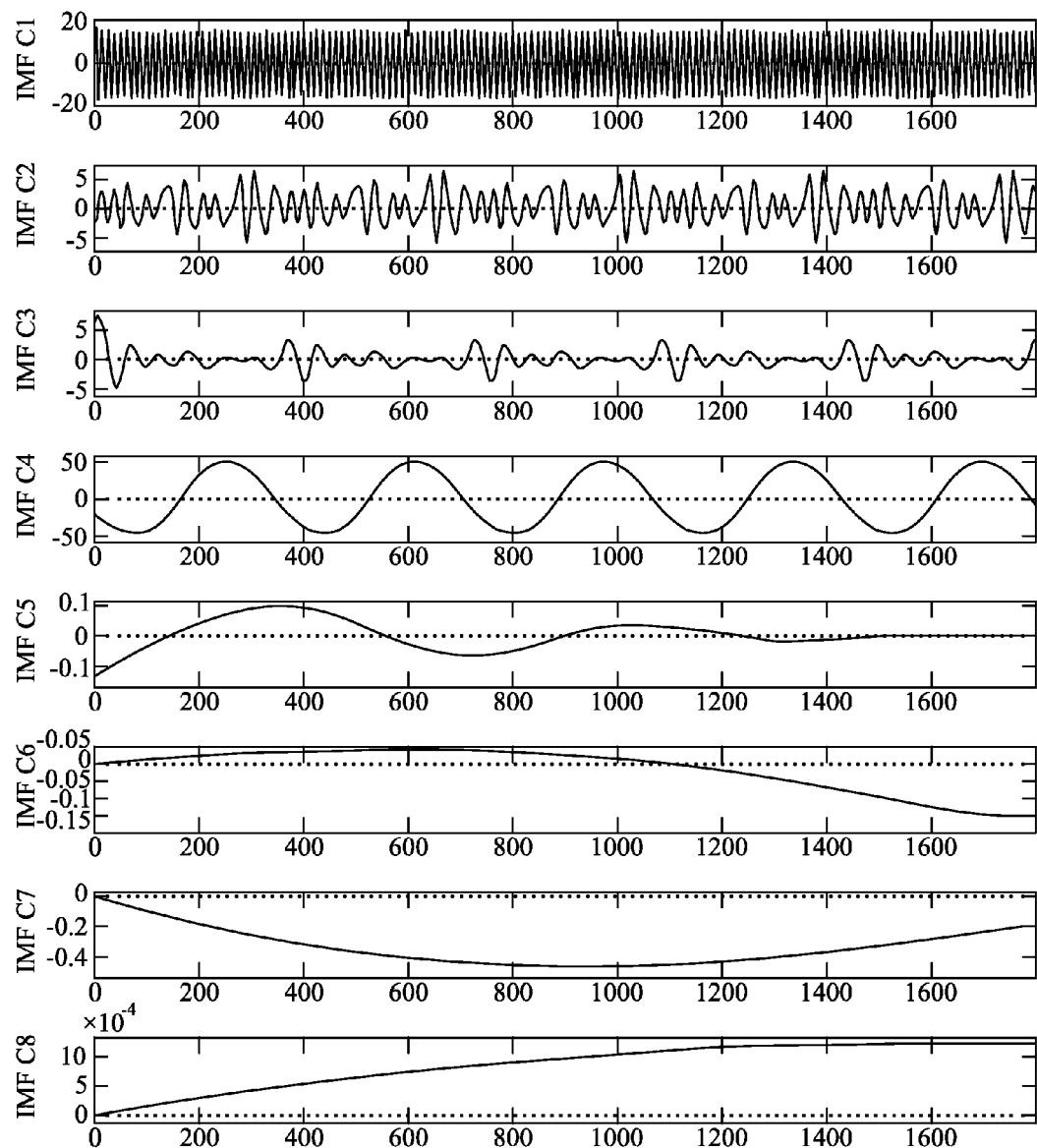
FIGS. 3A and 3B are graphic views showing all intrinsic-mode-function graphs in an exemplary preferred embodiment of the error measuring method of gear in the present invention.
Figure 3B:
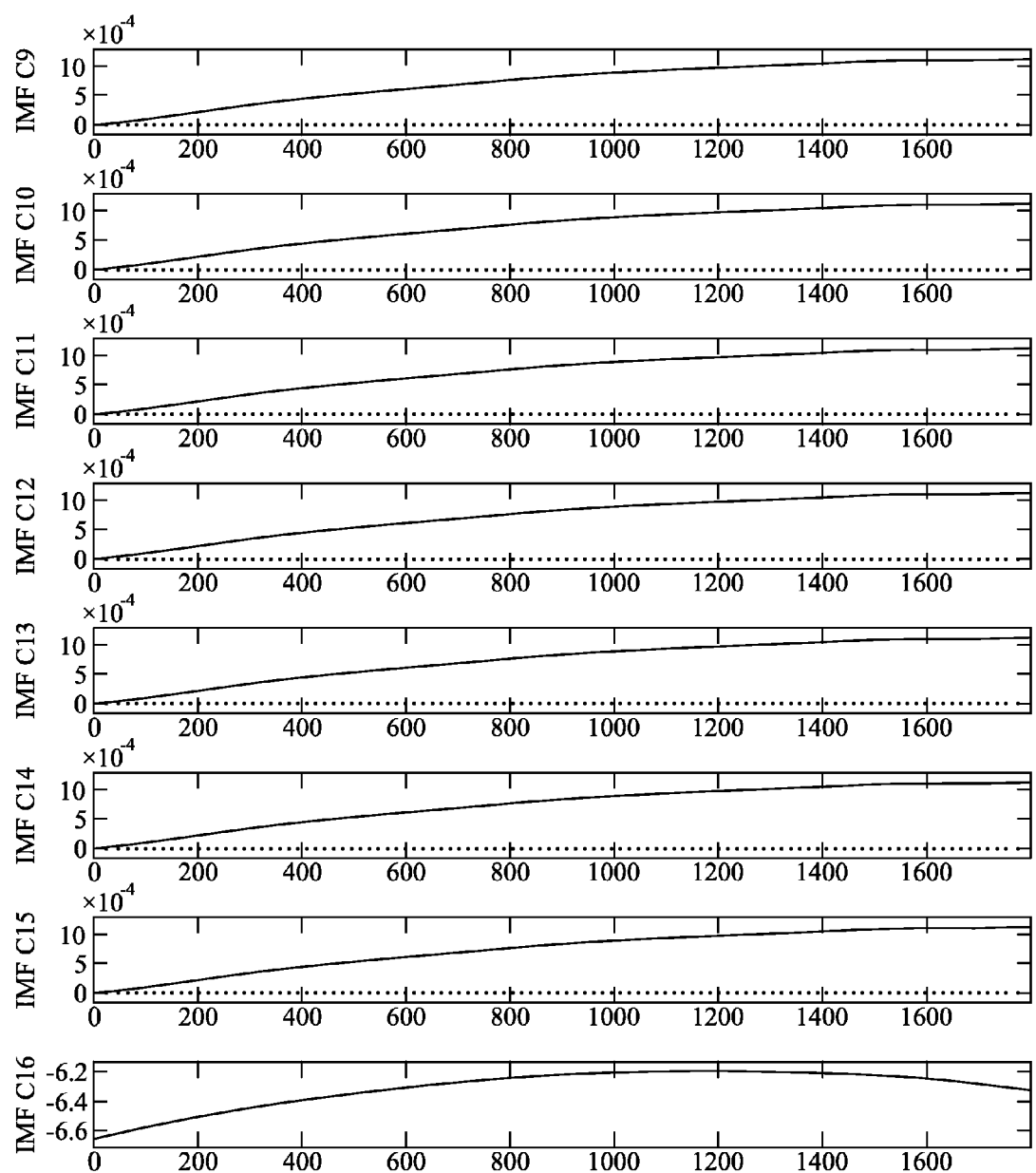

Step S110: the operation unit 210 decomposes the previous testing signal graph by means of Empirical Mode Decomposition (EMD) to generate a plurality of intrinsic-mode-function graphs (IMFs) as shown in FIGS. 3A and 3B.

In step S110, the first function graph has a first frequency value falling into a first numerical range such that the first frequency value thereof is most close to the meshing frequency of the gear pair 100 while the second function graph has a second frequency value falling into a second numerical range such that the second frequency value thereof is most close to the rotational frequency of the gear pair 100. Moreover, a value falling into the first numerical range is greater than a value falling into the second numerical range. Besides, the intrinsic-mode-function graph (IMF) generated from the previous testing signal graph may contain mode mixing, which needs further process as below.

Step S111: determine a conditional status whether there is any mode mixing case in the intrinsic-mode-function graph (IMF). Once the decision is made, then the flowing process goes to branching step 112 if judgment is "Yes" otherwise it goes to branching step 120 if judgment is "No".

Step S112: the previous decision in step S111 is made "Yes" that there is mode mixing case in the intrinsic-mode-function graph (IMF) and then the operation unit 210 further decomposes the previous testing signal graph by means of Ensemble Empirical Mode Decomposition (EEMD).

Step S120: the operation unit 210 selects a plurality of third function graphs from the intrinsic-mode-function graphs (IMFs). Each of the third functions has a corresponding third frequency value falling into a third numerical range such that a value falling into the third range is greater than the value falling into the second numerical range but not greater than the value falling into the first numerical range. Accordingly, the first function graph is among the third function graphs.

In an exemplary preferred embodiment of the error measuring method of gear in the present invention, the sampling frequency of the testing signal graph is 2000 Hz, and the operation unit 210 decomposes the testing signal graph by means of Empirical Mode Decomposition (EMD) to generate sixteen intrinsic-mode-function graphs IMF C1-IMF C16 as shown in FIGS. 3A and 3B. Wherein, IMF C1 contains frequency in range about 500-1000 Hz, IMF C2 contains frequency in range about 250-500 Hz while IMF C3 contains frequency in range about 125-250 Hz and so on. As shown in FIG.3A, IMF C1 is supposed to be the first function graph, IMF C4 is supposed to be the second function graph, and IMF C1-IMF C3 is supposed to be the third function graphs which have the frequency values greater than that of IMF C4, but not greater than that of IMF C1.

Figure 4:
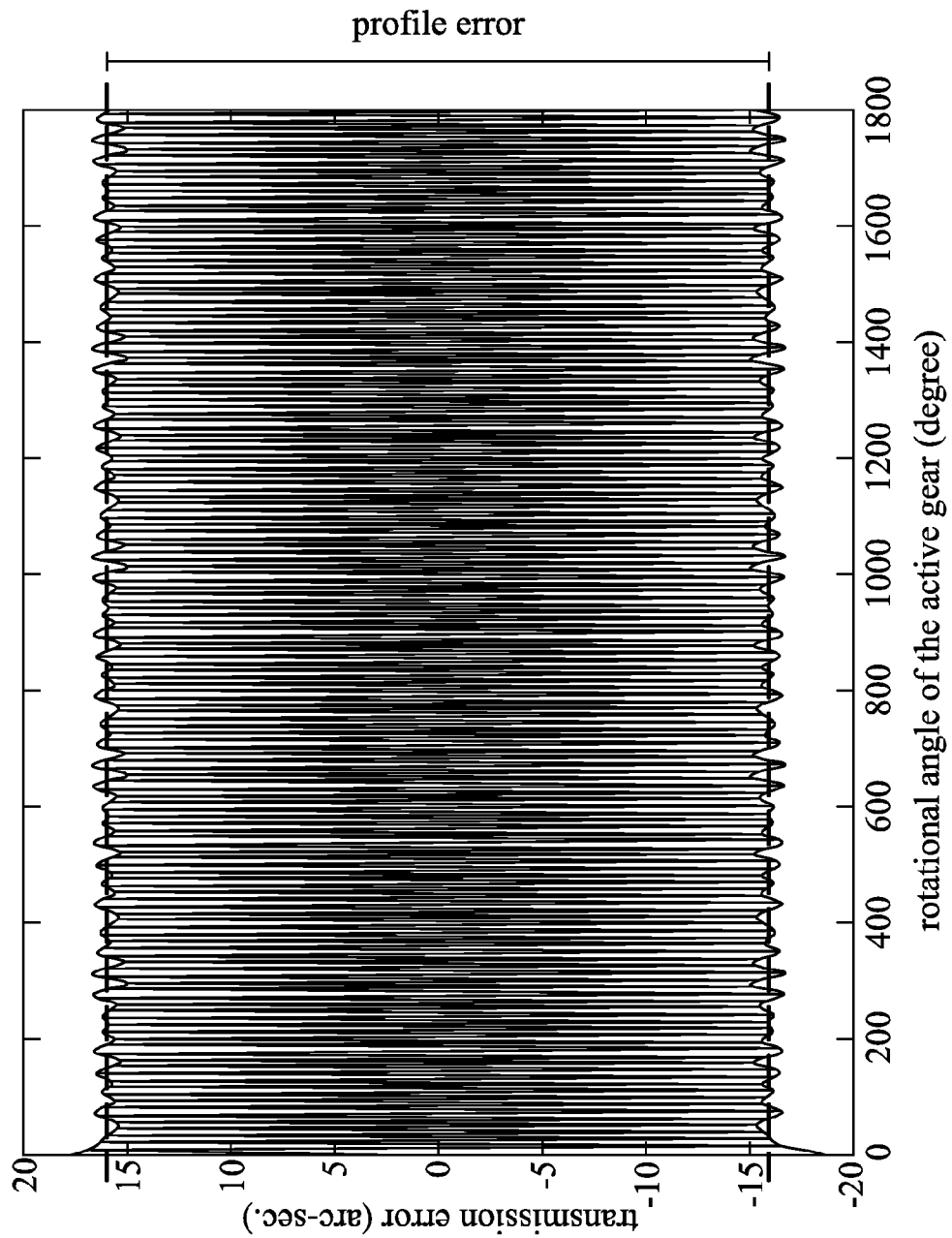
FIG. 4 is a graphic view showing a profile error of gear in an exemplary preferred embodiment of the error measuring method of gear in the present invention.

Step S130: the operation unit 210 combines the third function graph to produce a graph of superposing function, which contains a plurality of wave crests shown as FIG. 4.

Step S131: the operation unit 210 measures the amplitude of the first function graph to obtain a profile error of gear.

Step S132: the operation unit 210 measures the amplitude of the second function graph to obtain a deflection error of gear.

Step S140: the operation unit 210 computes out a plurality of single pitch error of gears by means of foregoing wave crests in the graph of superposing function and then computes out a plurality of adjacent pitch error of gears and an accumulated pitch error of gears by means of the single pitch error, wherein the adjacent pitch error of gears is defined as the difference of single pitch error of gears for every pair of adjacent pitches, and the accumulated pitch error of gears is defined as the combination of every single pitch error of gears for all pitches.

Step S150: by means of foregoing the profile error of gear produced by the first function graph, the deflection error of gear produced by the second function graph, the single pitch error of gears, the adjacent pitch error of gears and the accumulated pitch error of gears, the operation unit 210 computes and defines out a gear precision of the gear pair 100.

Please refer to FIG. 2, which is a graphic view showing a typical testing signal graph for an exemplary preferred embodiment of the error measuring method of gear in the present invention, wherein the X-coordinate (abscissa) denotes the rotational angle of the active gear while the Y-coordinate (vertical coordinate) the transmission error of the gear pair 100. The testing signal graph includes periodic and complicated signals. By means of Empirical Mode Decomposition (EMD), the operation unit 210 decomposes the previous testing signal graph as shown in FIG. 2 to generate a plurality of intrinsic-mode-function graphs (IMFs) as shown in FIGS. 3A and 3B (Step S110).

Figure 5:
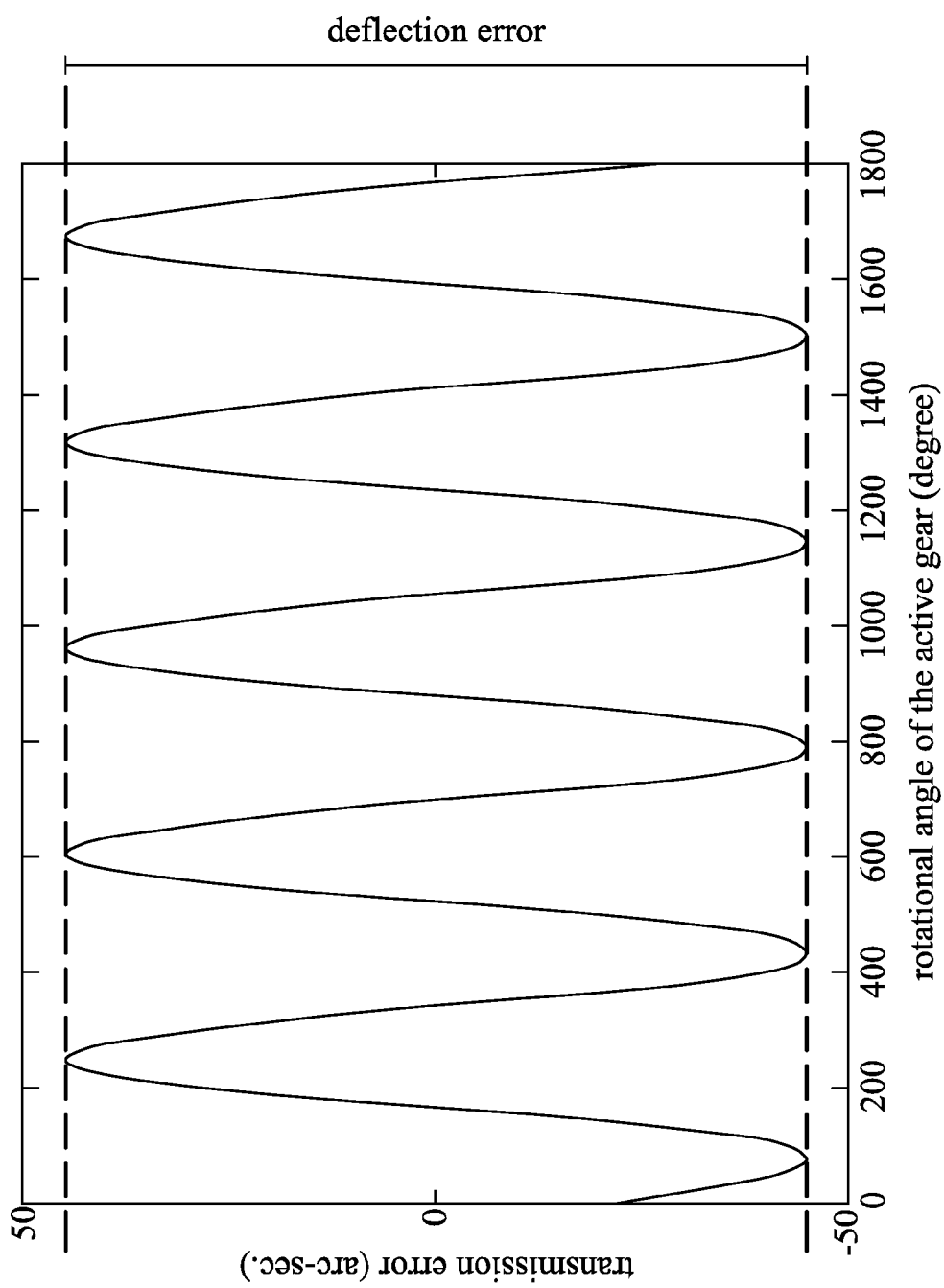
FIG. 5 is a graphic view showing a deflection error of gear in an exemplary preferred embodiment of the error measuring method of gear in the present invention.

Please refer to FIGS. 3A and 3B, which contains sixteen intrinsic-mode-function graphs (IMFs). The gear pair 100 provides a meshing frequency and a rotational frequency while the intrinsic-mode-function graphs provide a first fluctuation frequency and a second fluctuation frequency. The first function graph IMF C1 is an intrinsic-mode-function graph selected from intrinsic-mode-function graphs (IMFs) such that its fluctuation frequency is most close to the first fluctuation frequency among all of intrinsic-mode-function graphs (IMFs) while the second function graph IMF C4 is an intrinsic-mode-function graph selected from intrinsic-mode-function graphs (IMFs) such that its fluctuation frequency is most close to the second fluctuation frequency among all of intrinsic-mode-function graphs (IMFs). A profile error of gear as shown in FIG. 4 is obtained by the operation unit 210 via the average value for the upper envelope and lower envelope on the measured amplitude of the first function graph IMF C1 while a deflection error of gear as shown in FIG. 5 is obtained by the operation unit 210 via the average value for the upper envelope and lower envelope on the measured amplitude of the second function graph IMF C4.

Figure 6:
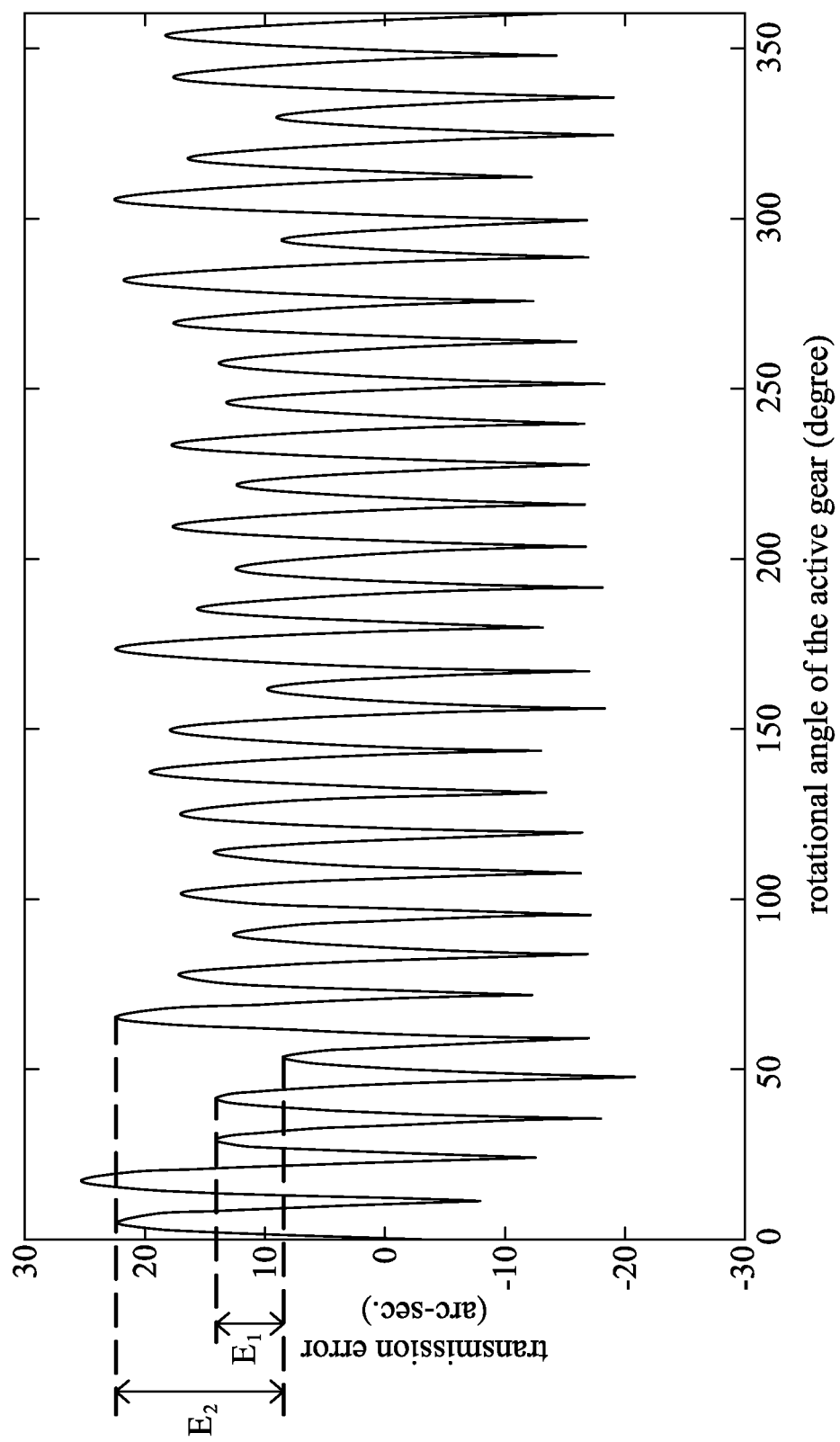
FIG. 6 is a graphic view showing a superposing function in an exemplary preferred embodiment of the error measuring method of gear in the present invention.

In step S120, the operation unit 210 selects certain intrinsic-mode-function graph from the foregoing intrinsic-mode-function graphs (IMFs) for analysis such that its fluctuation frequency is most close to or equivalent to the foregoing meshing frequency and a rotational frequency provided by the gear pair 100. As shown in FIG. 4, when the intrinsic-mode-function graph IMF C1 is selected as its fluctuation frequency is most close to the foregoing meshing frequency provided by the gear pair 100, a profile error of gear is defined by the operation unit 210 via average value for the upper envelope and lower envelope on the measured amplitude of the selected intrinsic-mode-function graph IMF C1. Similarly, as shown in FIG. 5, when the intrinsic-mode-function graph IMF C4 is selected as its fluctuation frequency is most close to the foregoing rotational frequency provided by the gear pair 100, a deflection error of gear is defined by the operation unit 210 via average value for the upper envelope and lower envelope on the measured amplitude of the selected intrinsic-mode-function graph IMF C4. Moreover, as shown in FIG. 6, when the intrinsic-mode-function graph of the previously selected intrinsic-mode-function graph IMF C1 and the intrinsic-mode-function graph of the previously selected intrinsic-mode-function graph IMF C4 are combined by the operation unit 210, a graph of superposing function is obtained by the operation unit 210, wherein the combination for the intrinsic-mode-function graph of the previously selected intrinsic-mode-function graph IMF C1 and the intrinsic-mode-function graph of the previously selected intrinsic-mode-function graph IMF C4 only for intrinsic-mode-function graphs IMF C1-IMF C3 but exclusive the intrinsic-mode-function graph IMF C4. As shown in FIG. 6, the graph of superposing function obtained by the operation unit 210 contains a plurality of wave crests. The single pitch error of gears is defined as the difference of wave crest values for every pair of adjacent pitches such as E1 and E2 but not limit to E1 and E2 only. Similarly, the adjacent pitch error of gears is defined as the difference of single pitch error of gears for every pair of adjacent pitches such as |E1−E2| but not limit to |E1−E2|only; and the accumulated pitch error of gears is defined as the combination of every single pitch error of gears for all pitches such as |E1 combine E2|, |E2 combine E3| and |E3 combine E4| but not limit to |E1 combine E2|, |E2 combine E3| and |E3 combine E4| only.

In final step S150, by means of foregoing the profile error of gear produced by the intrinsic-mode-function graph IMF C1, the deflection error of gear produced by the intrinsic-mode-function graph IMF C4, the single pitch error of gears, the adjacent pitch error of gears and the accumulated pitch error of gears, the operation unit 210 computes and defines out a gear precision of the gear pair 100.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An error measuring method of gear comprising following steps:
    providing a gear pair and a single gear flank testing device, the single gear flank testing device having an operation unit, the single gear flank testing device performing single gear flank testing of the gear pair for obtaining transmission error data used to produce a testing signal graph;
    the operation unit decomposing the testing signal graph by means of an Empirical Mode Decomposition (EMD) to generate a plurality of intrinsic-mode-function graphs (IMFs);
    the operating unit selecting a first function graph and a second function graph from the intrinsic-mode-function graphs (IMFs) wherein the first function graph fluctuates with a first frequency value falling into a first numerical range, and the first frequency value is most close to a meshing frequency of the gear pair, while the second function graph fluctuates with a second frequency value falling into a second numerical range, and the second frequency is most close to a rotational frequency of the gear pair, and wherein a value falling into the first numerical range is greater than a value falling into the second numerical range;
    the operation unit selecting a plurality of third function graphs from the intrinsic-mode-function graphs (IMFs), so that the first function graph is among the third function graphs, wherein each of the third function graphs fluctuates with a corresponding third frequency value that falls into a third numerical range, and a value falling into the third numerical range is greater than the value falling into the second numerical range but not greater than the value falling into the first numerical range;
    the operation unit combining the third function graphs to produce a graph of superposing function, the graph of superposing function having a plurality of wave crest values;
    the operation unit calculating a plurality of single pitch errors of the gears errors based on a difference of the wave crest values in the graph of superposing function for every pair of adjacent pitches, and calculating a plurality of adjacent pitch errors of the gears and an accumulated pitch error of the gears based on the plurality of single pitch errors, wherein the adjacent pitch errors of the gears are defined as a difference in single pitch errors the gears for every pair of adjacent pitches, and the accumulated pitch error of the gears is defined as a combination of every single pitch error of the gears for all pitches;
    the operation unit measuring the amplitude of the first function graph to obtain a profile error of the gears and measuring the amplitude of the second function graph to obtain a deflection error of the gears; and
    the operation unit transforming the profile error of the gears, the deflection error of the gears, the single pitch error of the gears, the adjacent pitch error of the gears and the accumulated pitch error of the gears into a definition of a gear precision of the gear pair.

2. The error measuring method of gear of claim 1, wherein the step of the operation unit decomposing the testing signal graph by means of Empirical Mode Decomposition (EMD) to generate a plurality of intrinsic-mode-function graphs (IMFs) further comprises the following steps:
    the operation unit determining a conditional status of whether there is a mode mixing case in the intrinsic-mode-function graph (IMF); and
    when a previous determination has been made that there is the mode mixing case in the intrinsic-mode-function graph (IMF), then the operation unit further decomposes the previous testing signal graph by means of Ensemble Empirical Mode Decomposition (EEMD).

3. The error measuring method of gear of claim 1, wherein the step of the operation unit measuring the amplitude of the first function graph to obtain a profile error of the gears is performed by the operation unit according to an average value for the upper envelope and lower envelope on the measured amplitude of the first function graph.

4. The error measuring method of gear of claim 1, wherein the step of the operation unit measuring the amplitude of the second function graph to obtain a deflection error of the gears is performed by the operation unit according to an average value for the upper envelope and lower envelope on the measured amplitude of the second function graph.

* * * * *